(12) United States Patent
Archambeault

(10) Patent No.: US 6,230,007 B1
(45) Date of Patent: May 8, 2001

(54) METHOD AND APPARATUS FOR DETECTING MESSAGE WAITING SIGNAL

(75) Inventor: John W. Archambeault, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/135,079

(22) Filed: Aug. 17, 1998

(51) Int. Cl.[7] .......................... H04M 11/10; H04M 3/42; H04M 1/64; H04Q 7/20

(52) U.S. Cl. .................. 455/425; 455/425; 455/414; 455/462; 455/464; 455/412; 379/88.12

(58) Field of Search .................................. 455/566, 567, 455/465, 462, 528, 67, 426, 414–417, 464; 379/88.12, 512, 527, 436

(56) References Cited

U.S. PATENT DOCUMENTS

| | | | |
|---|---|---|---|
| 5,259,021 | * 11/1993 | Antilla et al. | 379/61 |
| 5,327,493 | * 7/1994 | Richmond et al. | 379/372 |
| 5,825,852 | * 10/1998 | DePond et al. | 379/67 |

* cited by examiner

Primary Examiner—Daniel Hunter
Assistant Examiner—Meless Zewdu
(74) Attorney, Agent, or Firm—Williams, Morgan & Amerson

(57) ABSTRACT

A method and apparatus are provided for detecting a message waiting condition on a telephone. The method includes providing a control signal to a detect circuit in response to terminating a local use of the telephone, determining a message waiting signal on an external line connected to the telephone in response to the control signal, and activating a visual message waiting indicator in the telephone in response to determining the message waiting signal on the external line.

30 Claims, 3 Drawing Sheets

METHOD AND APPARATUS FOR DETECTING MESSAGE WAITING SIGNAL

BACKGROUND OF THE INVENTION

1. Field of the Invention

This invention relates generally to telephone signals, and, more particularly, to detecting a "message waiting" signal.

2. Description of the Related Art

There is a current trend among telecommunications providers to offer specialized services to users for greater convenience, flexibility, and reliability. The specialized services may include Caller ID, Call Blocker, Voice Message Recording (VMR), or the like. One specific example of the Voice Message Recording is Southwestern Bell's CallNotes®.

CallNotes® and other similar VMR services offer many advantages over conventional answering machines. For instance, CallNotes® allows subscribers to receive messages even while the telephone line is in use, either for voice and/or data communication. Additionally, VMR services offer many of the features of a conventional answering machine, without many of the accompanying restrictions. Because the messages are stored at a central location determined by the service provider, a subscriber may easily check messages from remote locations even when the subscriber's phone line is in use.

A subscriber having CallNotes® or its equivalent service can check messages by lifting a telephone and detecting a distinct "stutter" on the dial tone. Generally, the "stutter" tone lasts for a preselected interval before the standard, continuous tone resumes. Upon detection of the "stutter" tone, the subscriber can call a predetermined telephone number to retrieve messages. As mentioned above, the messages can also be retrieved from a remote location by simply calling the same telephone number. While the "stutter" tone achieves its intended purpose, customer demand has prompted service providers to seek a more visual, and less hands-on, method of detecting messages left by callers.

Service providers responded to customer demand by offering its subscribers telephones or stand-alone devices equipped with a Visual Message Waiting Indicator (VMWI). A VMWI comprises a light emitting diode (LED) that turns on or blinks periodically after a message is detected. The VMWI is activated upon detection of a Frequency Shift Keying (FSK) signal, a signal that is generated by service providers any time a caller leaves a message. Typically, the FSK signal is only sent once to a subscriber's telephone to indicate the presence of a message.

It is possible that in some instances a telephone device equipped with the VMWI may not be able to detect the FSK signal. This is particularly true if a condition exists where the telephone is in use but not connected to an external telephone line, where the external telephone line may be a Public Switched Telephone Network (PSTN) line or a Private Branch Exchange (PBX) line. An example of such a condition can be seen in a cordless telephone having a local conference call feature (e.g., communications between a handset and a base station). For illustrative purposes, it is assumed that the cordless telephone is connected to a PSTN line.

During a local conference call, the PSTN line is isolated from the analog-to-digital (A/D) and digital-to-analog (D/A) circuits of the cordless telephone. The A/D and D/A circuits are utilized for communication between the handset and base station for the duration of the local conference call. The isolation of the PSTN line from the A/D circuit is necessary to prevent the dial tone from being heard during the conference call. On the other hand, to detect the FSK signal, the PSTN line must be connected to the A/D circuit at all times. Thus, if the PSTN line is isolated from the A/D path during a local conference call, it is not possible to detect an incoming FSK signal for the duration of the conference call. An FSK signal received during a local conference call goes undetected even after the termination of that call. Hence, without the detection of the FSK signal, the VMWI will remain off, leaving the subscriber unaware of the pending message.

The present invention is directed to overcoming, or at least reducing the effects of, one or more of the problems set forth above.

SUMMARY OF THE INVENTION

In one aspect of the present invention, a method is provided for detecting a message waiting condition on a telephone. The method includes providing a control signal to a detect circuit in response to terminating a local use of the telephone, monitoring for a message waiting signal on an external line connected to the telephone in response to the control signal, and activating a visual message waiting indicator in the telephone in response to detecting the message waiting signal on the external line.

In one aspect of the present invention, a telephone is provided that includes a message waiting indicator and a local use switch that is capable of providing a control signal in response to termination of local use of the telephone. The telephone also includes a detect circuit that is adapted to receive the control signal, the detect circuit capable of monitoring for a message waiting signal on an external line in response to the control signal and capable of activating the message waiting indicator in response to detecting the message waiting signal on the external line.

BRIEF DESCRIPTION OF THE DRAWINGS

Other objects and advantages of the invention will become apparent upon reading the following detailed description and upon reference to the drawings in which.

Figure 1:
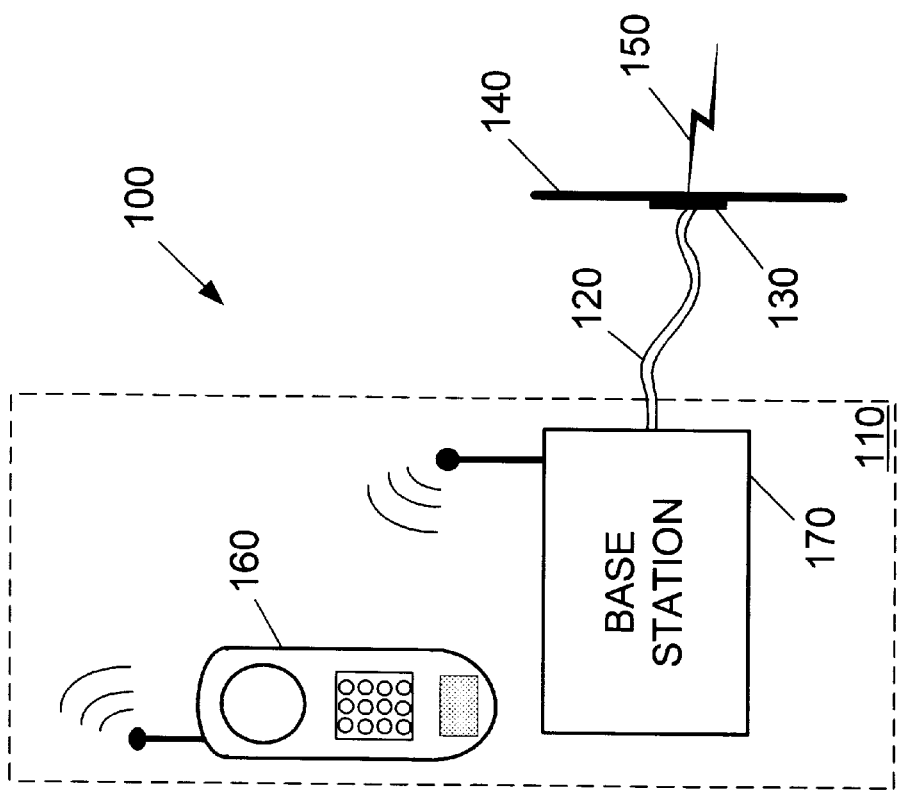
FIG. 1 is a block diagram of a telephone in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and businessrelated constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and in particular to FIG. 1, a block diagram of a communications system 100 in accordance with the present invention is illustrated. FIG. 1 includes a telephone 110, a telephone line 120, a telephone line interface 130 coupled to a fixed structure 140, and an external line 150. The fixed structure 140, for example, can be a wall. The external line 150 may be a PSTN line or a PBX line. The telephone 110 can be one of a variety of available telephones having a "local use" feature that, when invoked, disconnects the telephone (logically or physically) from the external line 150 and allows local use of the telephone 110. During a "local" use of the telephone 110, an A/D converter (not shown) of the telephone 110 is generally isolated from the external line 150.

For illustrative purposes, the telephone 110 in FIG. 1 is a cordless telephone 110, comprising a handset 160 and a base station 170. Cordless telephones 110 are generally designed for users whose movements are within a well-defined area. The cordless telephone 110 user makes calls from the portable handset 160 linked by radio signals to the fixed base station 170. The base station 170 is typically connected to the external line 150 through the telephone line interface 130. An attractive "local use" feature available in cordless telephones 110 is the "local conference call" feature, which allows communications between the handset 160 and the base station 170, independent of the external line 150.

The cordless telephone 110 can be utilized to make external calls (i.e., communication over the external line 150) or local conference calls. The external calls can be initiated by using the handset 160 to dial the desired telephone number of a remote telephone (not shown). The connection between the cordless telephone 110 and the remote telephone (not shown) is generally made over the external line 150 through a central switching office (not shown) or a private branch circuit (not shown). A local conference call, on the other hand, does not require the use of the external line 150, and, instead, allows a user situated near the base station 170 to communicate with a user in possession of the handset 160. Typically, during a local conference call, the external line 150 is isolated from the cordless telephone 110 so as to prevent the dial tone from interfering with the communication.

Figure 2:
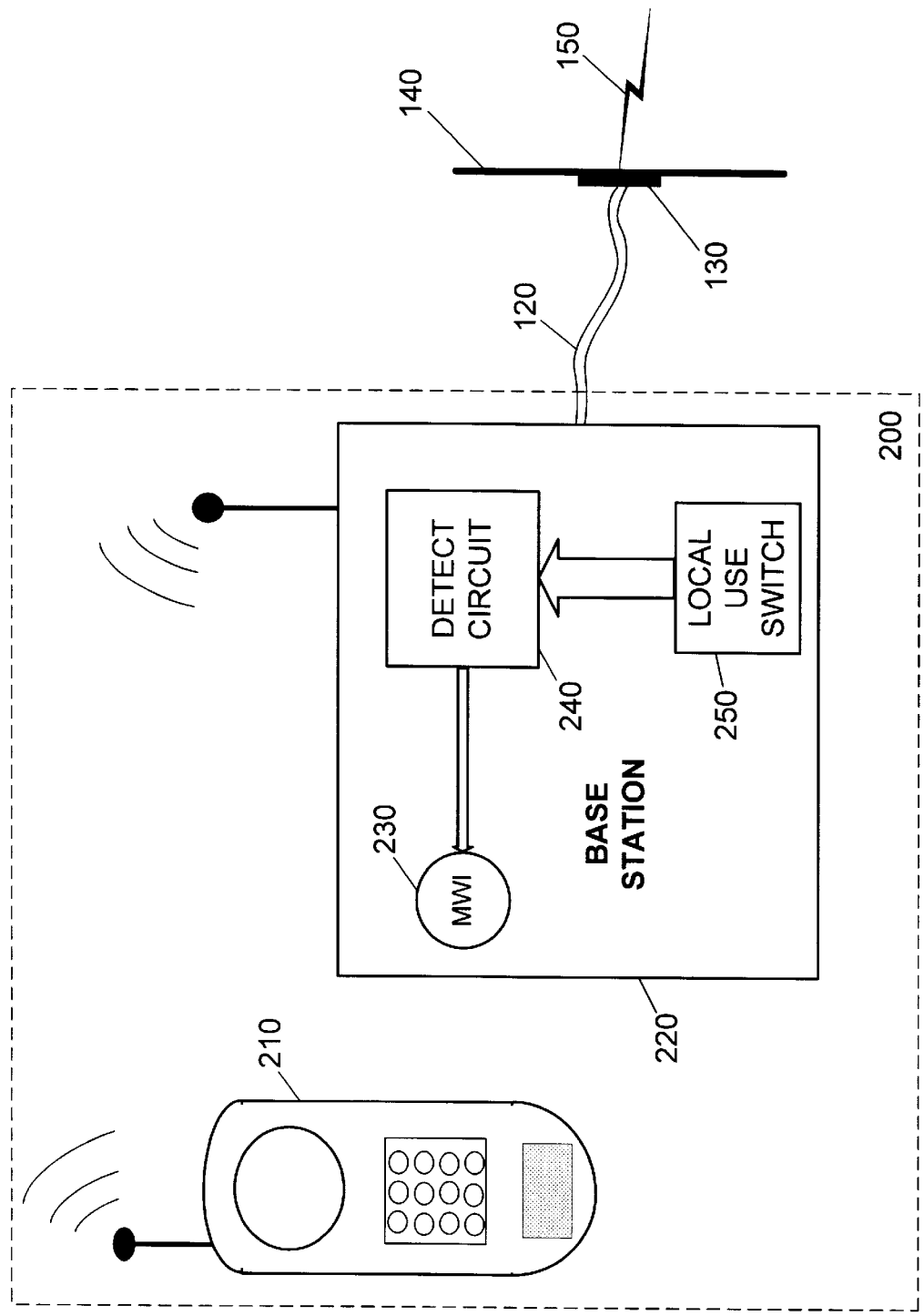
FIG. 2 is a specific embodiment of the telephone of FIG. 1 in accordance with the present invention.

FIG. 2 illustrates a specific embodiment of a telephone 200 in accordance with the present invention. The telephone depicted in FIG. 2 is a cordless telephone 200, comprising a handset 210 and a base station 220. The telephone line 120 connects the base station 220 to the external line 150 through the telephone line interface 130, where the telephone line interface 130 may be affixed to a fixed structure 140. The base station 220 includes a message waiting indicator 230, a detect circuit 240, and a local use switch 250. The message waiting indicator 230 can be a light-emitting diode capable of being activated by the detect circuit 240, which is described below in more detail. The message waiting indicator 230 in the illustrated embodiment is a visual message waiting indicator 230. However, it is contemplated that other message waiting indicators, such as those employing sound, may also be implemented in alternative embodiments.

The local use switch 250 in the illustrated embodiment is a switch that controls a local conference call feature of the cordless telephone 200. The local use switch 250, when selected to terminate the local conference call, directs the detect circuit 240 to connect to the external line 150 and search for a message waiting signal (e.g. stutter tone) on the external line 150.

Figure 3:
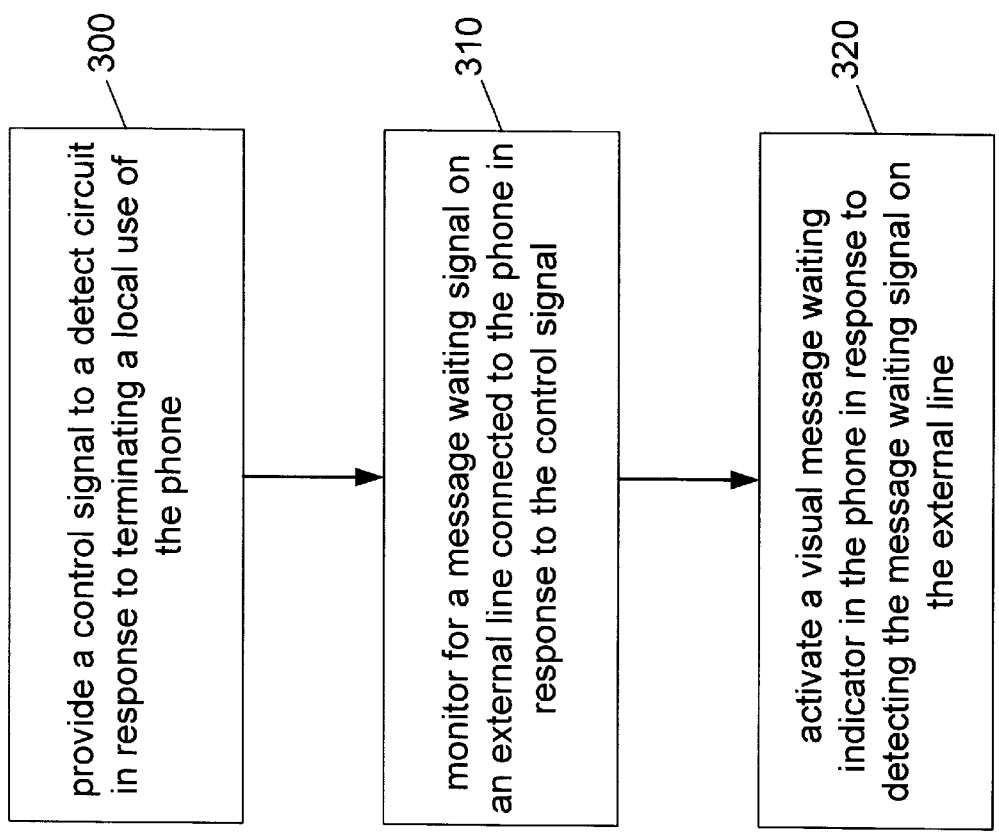
FIG. 3 is a flowchart of a method in accordance with the present invention that can be employed by the telephones of FIG. 1 and FIG. 2.

FIG. 3 illustrates a method in accordance with the present invention that can be implemented with the telephones 110, 200 of FIGS. 1 and 2. At block 300, after a user terminates the local conference call using the local use switch 250, a control signal is provided to the detect circuit 240. The detect circuit 240, at block 310, monitors for a message waiting signal on the external line 150. If a message waiting signal is detected on the external line 150, at block 320, the detect circuit 240 provides a signal to activate the visual message waiting indicator 230.

Those skilled in the art will appreciate that the detect circuit 240 can be implemented using logic components in a variety of ways well known to the art. Accordingly, the detect circuit 240 will not be described in detail herein. In one embodiment, the detect circuit 240 detects a stutter dial tone on the external line 150 by placing the telephone 200 off-hook, identifying a stutter dial tone "sequence" on the external line 150, and placing the telephone 200 on-hook. Generally, the stutter dial tone is composed of a "normal" dial tone interval, followed by an interval of "silence," then by the "normal" dial tone interval, then by another interval of "silence," and then by a continuous dial tone thereafter. The "normal" dial tone and the "silence" intervals, for example, may be 80-millisecond intervals, although the duration of the intervals may vary from one service provider to another. The detect circuit 240 is capable of detecting the stutter tone by sampling the external line 150 at an equal or higher frequency than the stutter dial tone. For example, by sampling at a rate four times faster than the stutter dial tone frequency, the detect circuit 240 can detect at least two periods of "silence" as well as the two periods of "normal" dial tone. Accordingly, the stutter dial tone can be identified upon detection of a "normal," "silence," "normal," "silence," "normal," "normal" sequence.

By implementing the method of FIG. 3, the telephones 110, 200 of FIGS. 1 and 2 are capable of enabling the visual message light indicator 230 even for messages left during a local conference call. Because the cordless telephone 200 is "in use" during a local conference call, and therefore is substantially incapable of receiving signals from the external line 150, the FSK signal that would ordinarily activate the visual message light indicator 230 goes undetected by the cordless telephone 200. As a result, the visual message light indicator 230 remains inactivated. The present invention employs the method of FIG. 3 to ensure that the visual message light indicator 230 is properly activated if a message is left during the local conference call.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A cordless telephone, comprising:
   a message waiting indicator;
   a handset; and
   a base station capable of communicating with the handset, comprising:
      a local use switch capable of providing a control signal in response to termination of local use of the telephone, wherein the local use of the telephone disconnects the telephone from an external line; and a detect circuit adapted to receive the control signal, the detect circuit capable of monitoring for a message waiting signal on the external line in response to the control signal and capable of activating the message waiting indicator in response to detecting the message waiting signal on the external line.

2. The cordless telephone of claim 1, wherein the message waiting indicator is a visual message waiting indicator.

3. The cordless telephone of claim 2, wherein the visual message waiting indicator resides in the base station.

4. The cordless telephone of claim 1, wherein the local use switch is capable of providing a control signal in response to termination of a local conference call between the handset and the base station.

5. The cordless telephone of claim 1, wherein the external line is a public switched telephone line.

6. The cordless telephone of claim 1, wherein the external line is a private branch exchange line.

7. The cordless telephone of claim 1, wherein the message waiting indicator is an audio message waiting indicator.

8. A telephone, comprising:

a message waiting indicator;

a local use switch capable of providing a control signal in response to termination of local use of the telephone wherein the local use of the telephone disconnects the telephone from an external line; and a detect circuit adapted to receive the control signal, the detect circuit capable of monitoring for a message waiting signal on the external line in response to the control signal and capable of activating the message waiting indicator in response to detecting the message waiting signal on the external line.

9. The telephone of claim 8, wherein the message waiting indicator is a visual message waiting indicator.

10. The telephone of claim 8, wherein the message waiting indicator is an audio message waiting indicator.

11. The telephone of claim 8, wherein the local use switch is capable of providing a control signal in response to termination of a local conference call.

12. The telephone of claim 8, wherein the external line is a public switched telephone line.

13. The telephone of claim 8, wherein the external line is a private branch exchange line.

14. The telephone of claim 8, wherein the local use disconnects the telephone from an external line includes the local use logically disconnects the telephone from an external line.

15. The telephone of claim 8, herein the local use disconnects the telephone from an external line includes the local use physically disconnects the telephone from an external line.

16. A method for detecting a message waiting condition on a telephone, comprising:

providing a control signal to a detect circuit in response to terminating a local use of the telephone, wherein the local use disconnects the telephone from an external line;

monitoring for a message waiting signal on the external line conned to the telephone in response to the control signal;

detecting the message waiting signal on the external line; and activating a message waiting indicator in the telephone in response to detecting the message waiting signal on the external line.

17. The method of claim 16, wherein monitoring for a message waiting signal comprises:

placing the telephone off-hook;

detecting the message waiting signal on the external line; and placing the telephone on-hook.

18. The method of claim 17, wherein detecting the message waiting signal includes detecting a stutter dial tone.

19. The method of claim 18, wherein detecting the stutter dial tone includes detecting a stutter dial tone sequence.

20. The method of claim 16, wherein terminating the local use of the telephone comprises terminating a local conference call.

21. The method of claim 16, wherein detecting the message waiting signal on the external line comprises detecting a stutter tone on the external line.

22. The method of claim 16, wherein detecting the message waiting signal on an external line includes detecting the message waiting signal on a public switched telephone line.

23. The method of claim 16 wherein detecting the message waiting signal on an external line includes detecting the message waiting signal on a private branch exchange line.

24. The method of claim 16 wherein providing a control signal to a detect circuit in response to terminating a local use of the telephone, wherein the local use disconnects the telephone from an external line includes providing a control signal to a detect circuit in response to terminating a local use of the telephone, wherein the local use logically disconnects the telephone from an external line.

25. The method of claim 16, wherein providing a control signal to a detect circuit in response to terminating a local use of the telephone, wherein the local use disconnects the telephone from an external line includes providing a control signal to a detect circuit in response to terminating a local use of the telephone, wherein the local use physically disconnects the telephone from an external line.

26. The cordless telephone of claim 1, wherein the local use disconnects the telephone from an external line includes the local use logically disconnects the telephone from an external line.

27. The cordless telephone of claim 1, wherein the local use disconnects the telephone from an external line includes the local use physically disconnects the telephone from an external line.

28. A cordless telephone, comprising:

a visual message waiting indicator;

a handset; and a base station capable of communicating with the handset, comprising:

a local use switch capable of providing a control signal in response to termination of local use of the telephone, wherein the local use switch is capable of providing a control signal in response to termination of a local conference call between the handset and the base station; and a detect circuit adapted to receive the control signal, the detect circuit capable of monitoring for a message waiting signal on an external line in response to the control signal and capable of activating the message waiting indicator in response to detecting the message waiting signal on the external line.

29. The cordless telephone of claim 28, wherein the external line is a public switched telephone line.

30. The cordless telephone of claim 28, wherein the external line is a private branch exchange line.

* * * * *